United States Patent [19]

Martin et al.

[11] Patent Number: 4,641,804
[45] Date of Patent: Feb. 10, 1987

[54] ARTICLE SUPPORTING BRACKET FOR SURVEY TRIPOD

[75] Inventors: Robert H. Martin, Overland Park, Kans.; Bradley J. Rozelle; Thomas J. Breier, both of Kansas City, Mo.

[73] Assignee: The Lietz Company, Shawnee Mission, Kans.

[21] Appl. No.: 720,801

[22] Filed: Apr. 8, 1985

[51] Int. Cl.⁴ ............................................. A47F 5/02
[52] U.S. Cl. .................................. 248/205.1; 33/299
[58] Field of Search .............. 248/205.1, 186, 179, 248/187, 349, 289.1; 33/299, 274; 403/299

[56] References Cited

U.S. PATENT DOCUMENTS

| | | | |
|---|---|---|---|
| 588,552 | 8/1897 | Brownell | 248/186 |
| 730,830 | 6/1903 | Lingle | 248/179 X |
| 1,260,136 | 3/1918 | Brewer | 248/205.1 X |
| 1,386,664 | 8/1921 | Vaeth | 248/186 |
| 1,984,026 | 12/1934 | Little | 403/299 X |
| 2,283,422 | 5/1942 | Chamberlain, Jr. | 248/186 |
| 2,720,372 | 10/1955 | Gowan | 248/186 |
| 2,788,949 | 4/1957 | Gurries | 211/134 X |
| 3,319,914 | 5/1967 | Chippetta, Jr. | 248/205.1 |
| 3,368,689 | 2/1968 | Porterfield | 248/289.1 X |
| 4,254,925 | 3/1981 | Kooi | 248/179 X |

Primary Examiner—Ramon S. Britts
Assistant Examiner—Blair M. Johnson
Attorney, Agent, or Firm—Schmidt, Johnson, Hovey & Williams

[57] ABSTRACT

A bracket between the head of a tripod and a primary surveying instrument has a bottom ring provided with a disc, a collar rotatable on the disc and a top collar-retaining ring releasably attached to the bottom ring. A plate, integral with and extending laterally of the collar has a lip which supports an inclined, removable shelf which is, in turn adaptable for having a secondary instrument detachably mounted thereon. A fastener is interposed between a boss on the primary instrument and a stud rigid to the tripod head within a cavity of the latter that receives a flange on the bottom ring.

1 Claim, 4 Drawing Figures

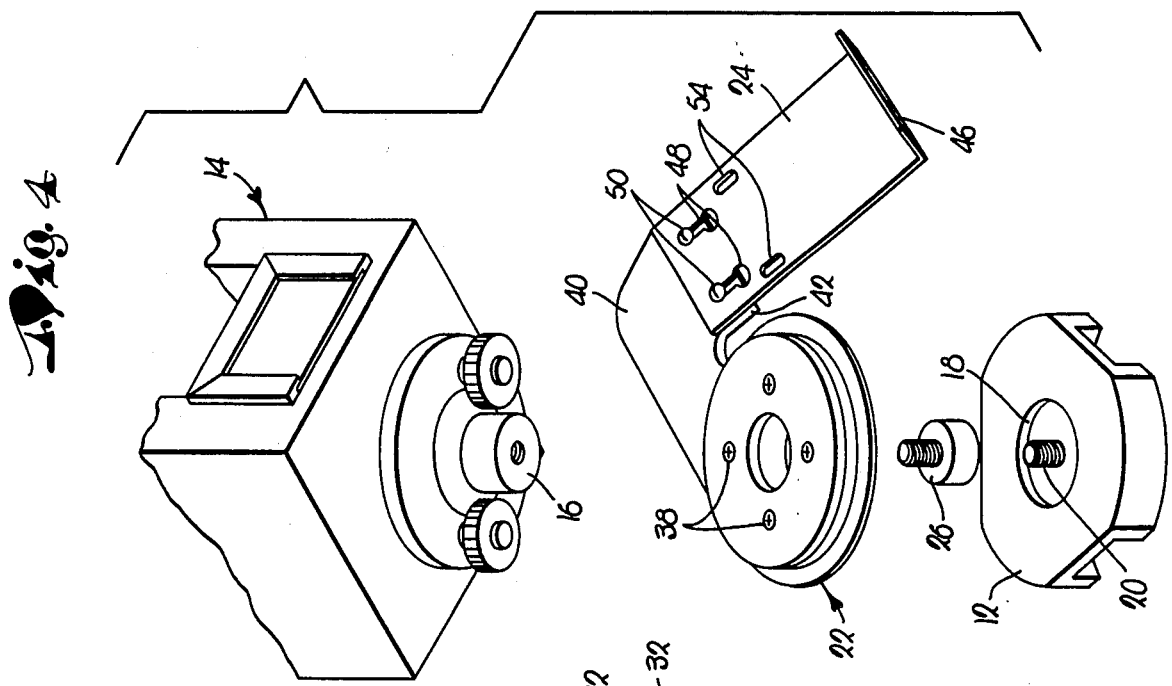
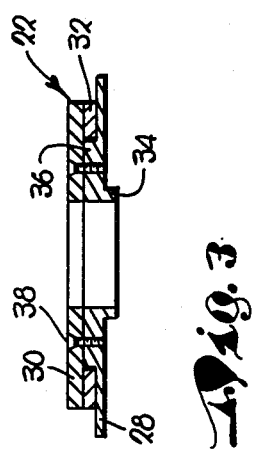
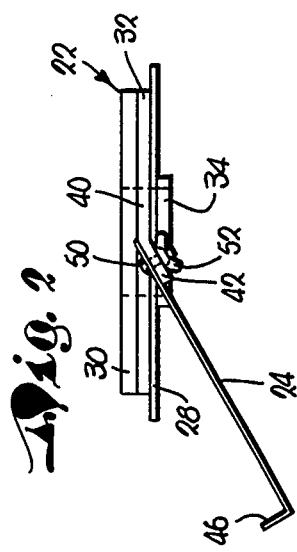
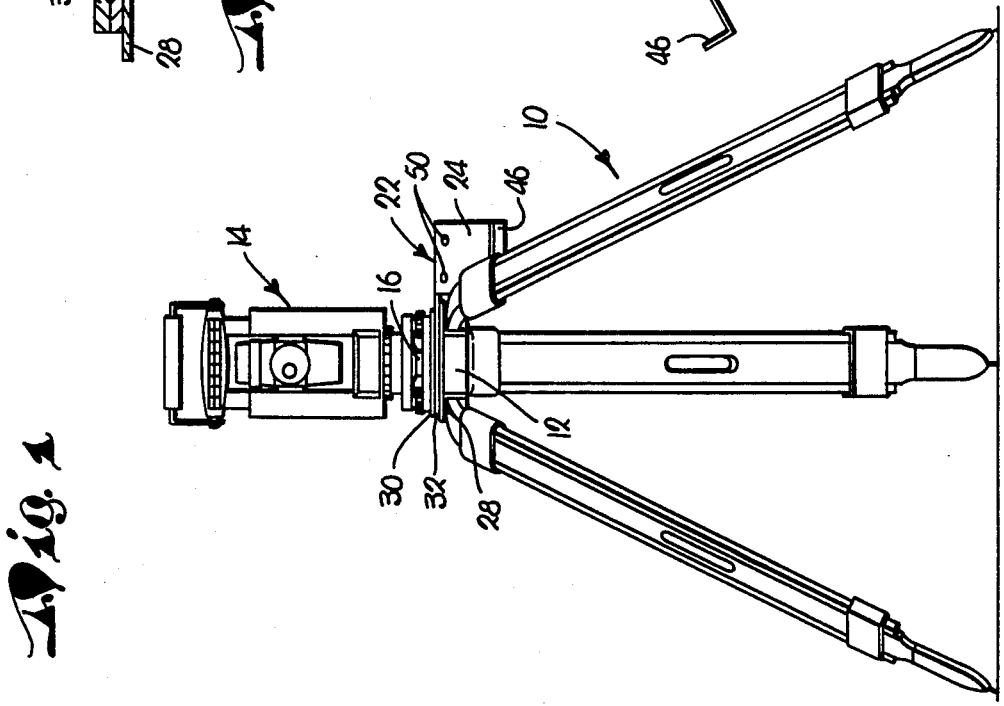

ARTICLE SUPPORTING BRACKET FOR SURVEY TRIPOD

BACKGROUND OF THE INVENTION

In the art and science of determining the area and configuration of portions of the surface of the earth, a shelved bracket is interposed between a primary surveying instrument and the head of a tripod for supporting data recorders electrically coupled with the survey instrument.

Modern day survey equipment uses computerized systems which automatically collect and store field data for ultimate transfer to printed forms. The electronic recorder, operably coupled with the survey instrument, must be hand-held by the surveyor adjacent the tripod, giving rise to a need for a suitable support.

Hence, as a solution to the problem, the instant invention utilizes the tripod itself as a mount for a bracket which carries a shelf having many uses, including convenient attachment of the recorder thereto. The bracket is easily and quickly interposed between the tripod head and the overlying survey instrument where it is firmly held in place without need for any modification of either the tripod or the survey equipment which it carries.

IN THE DRAWING

FIG. 1 is an elevational view of a survey tripod embodying an article support bracket made pursuant to our present invention;

FIG. 2 is an elevational view of the bracket removed from the tripod;

FIG. 3 is a diametrical cross-sectional view through the bracket; and

FIG. 4 is an exploded, perspective view of the bracket, the tripod head and a portion of the survey instrument.

DESCRIPTION OF THE PREFERRED EMBODIMENT

A three-legged stand or tripod 10, having a top head 12, to which the legs are swingably attached, supports the weight of a surveying instrument 14. Normally the instrument 14 is releasably attached to the head 12 by an internally threaded boss 16 depending from the instrument 14, fitting into a cavity 18 in the upper face of the head 12, and receiving an upstanding, externally threaded stud 20 in the cavity 18 and rigid to the head 12.

In accordance with the instant invention a bracket 22 for supporting an article on a shelf 24 is interposed between the head 12 and the instrument 14 and held in place through use of the boss 16, the cavity 18 and the stud 20 by the provision of an extension fastener 26 to accommodate the thickness of the bracket 22. The fastener 26 is tapped to receive the stud 20 and threaded to receive the boss 16.

The bracket 22 includes a base ring 28, a top ring 30 and a collar 32 interposed between the rings 28 and 30. The ring 28 has a lower flange 34, which fits complementally in the cavity 18, and an upper disc 36 which complementally receives the collar 32. The disc 36, integral with the ring 28, is at least as thick as the collar 32 such that the latter is free to rotate about the disc 36, guided by the latter and slidable on the ring 28. A number of cap screws 38 or the like, internally of the collar 32 clamp the rings 28 and 30 together.

The ring 28 rests on the head 12, the boss 16 passes through the rings 28 and 30, the disc 36 and the collar 32, and rests on the fastener 26; the fastener 26 rests on the head 12 within the cavity 18.

A plate 40, integral with and extending laterally of the collar 32 has an inclined lip 42 which receives the shelf 24 provided with a lip 46. Keyhole slots 48 in the shelf 24 receive bolts 50 that pass through the lip 42 and are provided with wing nuts 52. Articles to be supported by the shelf 24 may be held in place by a releasable strap passing through slots 54 in the shelf 24.

OPERATION

The bracket 22 is placed in use by first rotating the instrument 14 to disengage the boss 16 from the stud 20. The fastener 26 is then attached to the stud 20. The plate 28 is thereupon placed on the head 12 to insert the flange 34 into the cavity 18. This is followed by extending the boss through the ring 30, the collar 32 and the disc 36 and the ring 28. The instrument 14 is then rotated to attach the boss 16 to the fastener 26.

The shelf 24 is now ready to receive an article to be strapped thereto as, for example, an electronic device for collecting, storing, recording and processing survey data from the instrument 14. If desired, the shelf 24 may be removed from the lip 42 while the device remains attached to the shelf 24 by simply loosening the nuts 52.

We claim:

1. In combination:
   a support tripod having an instrument-supporting head adjacent the upper end thereof and including an uppermost instrument-supporting face, said head presenting in said uppermost face a circular recess and a central, upstanding, threaded stud member within said recess;
   a surveying instrument having an underside presenting a depending boss adapted to fit within said recess, said boss having a central, threaded opening adapted to threaded opening adapted to threadably receive said stud;
   a bracket assembly interposed between and interconnecting said tripod head and instrument, said bracket assembly including—
   a flat annular baseplate having a depending central flange received within said recess;
   a top ring clamped to said baseplate, there being a central upright opening cooperatively defined by the top ring and baseplate and an unobstructed outboard annular space between said top ring and baseplate;
   a connector element within said annular space for clamping said instrument underside to said top ring, said connector element having a lower threaded boss receiving said stud and an upper threaded element received within said boss;
   an annular collar located within said annular space and freely rotatable at all times relative to said baseplate and top ring,
   a plate extending outwardly from said collar and rotatable therewith; and an elongate shelf coupled by coupling means with the outer end of said plate and oriented at a downward angle relative to said collar for supporting an article and allowing the user to freely rotate the article as desired about a full 360° around said instrument, said coupling means including structure for axial adjustment of said shelf.

* * * * *